United States Patent
Ichikawa et al.

(10) Patent No.: US 11,601,029 B2
(45) Date of Patent: Mar. 7, 2023

(54) ELECTRIC POWER STEERING DEVICE

(71) Applicant: Mitsubishi Electric Corporation, Tokyo (JP)

(72) Inventors: Takanori Ichikawa, Tokyo (JP); Akira Kimishima, Tokyo (JP); Satoshi Iohara, Tokyo (JP)

(73) Assignee: Mitsubishi Electric Cornoration, Tokyo (JP)

( * ) Notice: Subject to any disclaimer, the term of this patent is extended or adjusted under 35 U.S.C. 154(b) by 297 days.

(21) Appl. No.: 16/641,360

(22) PCT Filed: Oct. 13, 2017

(86) PCT No.: PCT/JP2017/037225
§ 371 (c)(1),
(2) Date: Feb. 24, 2020

(87) PCT Pub. No.: WO2019/073604
PCT Pub. Date: Apr. 18, 2019

(65) Prior Publication Data
US 2020/0235645 A1    Jul. 23, 2020

(51) Int. Cl.
*H02K 11/33* (2016.01)
*H02K 11/30* (2016.01)
(Continued)

(52) U.S. Cl.
CPC ............ *H02K 5/225* (2013.01); *B62D 5/046* (2013.01); *H02K 3/522* (2013.01); *H02K 11/30* (2016.01); *H02K 11/33* (2016.01)

(58) Field of Classification Search
CPC ...... B62D 5/0406; B62D 5/046; H02K 11/33; H02K 2203/09; H02K 5/22; H02K 5/225; H02K 3/522; H02K 11/30; H02K 11/38
(Continued)

(56) References Cited
U.S. PATENT DOCUMENTS

2010/0327680 A1* 12/2010 Miyachi ............... H02K 11/024
                                                    310/71
2012/0098366 A1*  4/2012 Yamasaki ............... H02K 9/22
                                                    310/72
(Continued)

FOREIGN PATENT DOCUMENTS

JP       2008-17635 A    1/2008
JP     2012-197051 A    10/2012
(Continued)

OTHER PUBLICATIONS

Horiuchi et al, Electric Power Steering Device, Oct. 18, 2012, JP 2012197051 (English Machine Translation) (Year: 2012).*
(Continued)

*Primary Examiner* — Alexander A Singh
(74) *Attorney, Agent, or Firm* — Sughrue Mion, PLLC; Richard C. Turner

(57) ABSTRACT

According to this invention, provided is an electric power steering device, including: a motor having a winding; and a control unit configured to control the motor, the motor and the control unit being integrated with each other in alignment with each other in an axial direction of a rotary shaft of the motor. The winding of the motor includes a winding end portion configured to receive a current supplied thereto. The control unit includes: a current supply circuit, which includes a supply terminal, and is configured to supply the current to the winding end portion; an extension member connected to the supply terminal; and a first connection portion at which the extension member and the winding end portion are connected to each other. The first connection portion is arranged on a radially outer side of the motor with respect to the current supply circuit.

6 Claims, 5 Drawing Sheets

(51) Int. Cl.
  *H02K 5/22* (2006.01)
  *B62D 5/04* (2006.01)
  *H02K 3/52* (2006.01)

(58) Field of Classification Search
  USPC ........................................ 310/71, 68 R, 68 D
  See application file for complete search history.

(56) References Cited

U.S. PATENT DOCUMENTS

| | | | |
|---|---|---|---|
| 2013/0099610 A1 | 4/2013 | Suga et al. | |
| 2013/0257192 A1 | 10/2013 | Tsuboi et al. | |
| 2014/0062236 A1* | 3/2014 | Taniguchi | H02K 3/28 310/71 |
| 2014/0091683 A1 | 4/2014 | Ito et al. | |
| 2015/0236570 A1* | 8/2015 | Hayashi | H02K 11/33 310/71 |
| 2016/0254732 A1 | 9/2016 | Kojima et al. | |

FOREIGN PATENT DOCUMENTS

| | | | |
|---|---|---|---|
| JP | 2012197051 A | * | 10/2012 |
| JP | 5720958 B2 | | 5/2015 |
| JP | 2016-005384 A | | 1/2016 |
| JP | 2016-163414 A | | 9/2016 |
| JP | 6119631 B2 | | 4/2017 |

OTHER PUBLICATIONS

Communication dated Aug. 25, 2020 issued by the European Patent Office in application No. 17928670.3.
International Search Report of PCT/JP2017/037225 dated Dec. 19, 2017 [PCT/ISA/210].
Communication dated May 26, 2020 by the Japanese Patent Office in application No. 2019-547887.
Communication dated Jun. 13, 2022 from the European Patent Office in European Application No. 17 928 670.3.

* cited by examiner

ELECTRIC POWER STEERING DEVICE

CROSS REFERENCE TO RELATED APPLICATIONS

This application is a National Stage of International Application No. PCT/JP2017/037225, filed Oct. 13, 2017.

TECHNICAL FIELD

This invention relates to an electric power steering device, which is to be applied to a vehicle and includes a motor and a control unit integrated with each other.

BACKGROUND ART

In an electric power steering device which includes a motor and a control unit integrated with each other, the control unit is provided on a side opposite to an output side of a rotary shaft of the motor. An inverter circuit for supplying a current to a winding of a stator of the motor is often made available as a power module, and is arranged in the control unit. An output terminal of the power module is connected to the winding of the stator. For example, as a related art, there is a rotary electric machine in which a winding is connected to an output terminal of a power module through intermediation of a circuit board (see, for example, Patent Literature 1).

CITATION LIST

Patent Literature

[PTL 1] JP 5720958 B

SUMMARY OF INVENTION

Technical Problem

However, the related art has the following problem. In the rotary electric machine described in Patent Literature 1, the winding is connected to the output terminal of the power module through intermediation of the circuit board instead of being directly connected the output terminal of the power module. Therefore, the related-art rotary electric machine has poor operability regarding connection, with the result that cost reduction is hindered.

This invention has been made to solve the problem as described above, and has an object to provide an electric power steering device which enables improvement in operability in manufacturing the device and reduction in cost for manufacturing.

Solution to Problem

According to one embodiment of this invention, there is provided an electric power steering device, including: a motor including a winding; and a control unit configured to control the motor, the motor and the control unit being integrated with each other in alignment with each other in an axial direction of a rotary shaft of the motor. The winding of the motor includes a winding end portion configured to receive a current supplied thereto. The control unit includes: a current supply circuit, which includes a supply terminal, and is configured to supply the current to the winding end portion; an extension member connected to the supply terminal; and a first connection portion at which the extension member and the winding end portion are connected to each other. The first connection portion is arranged on a radially outer side of the motor with respect to the current supply circuit.

Advantageous Effects of Invention

According to this invention, there is provided a configuration which enables an operation regarding a connection portion connecting a winding of a motor and a current supply circuit as an inverter circuit to each other, from a radially outer side of a control unit.

Thus, it is possible to provide an electric power steering device which enables improvement in operability in manufacturing the device and reduction in cost for manufacturing.

DESCRIPTION OF EMBODIMENTS

Figure 1:
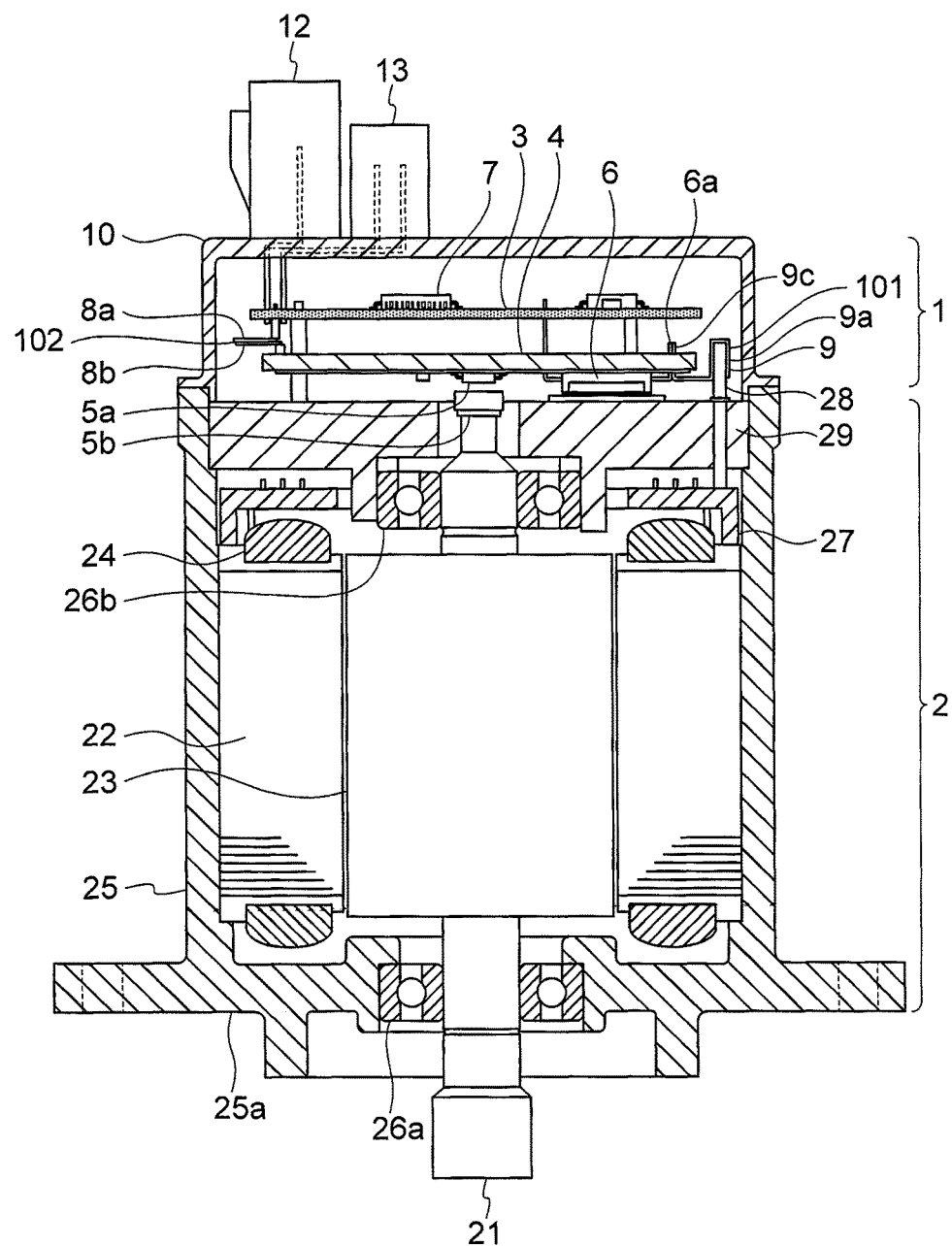
FIG. 1 is a configuration view and a partial sectional view of an electric power steering device according to a first embodiment of this invention.

Referring to the accompanying drawings, an electric power steering device according to each embodiment of this invention is described in detail below. In the drawings, like or corresponding parts are denoted by like symbols, and redundant description is omitted.

First Embodiment

FIG. 1 is a configuration view of an electric power steering device according to a first embodiment of this invention, and a cross-section thereof is partially illustrated.

The electric power steering device according to the first embodiment is applied to a vehicle, and includes a control unit 1 and a motor 2. The control unit 1 is configured to control the motor 2. The control unit 1 is integrated with the motor 2 in alignment with the motor 2 in an axial direction of a rotary shaft 21 of the motor 2.

The motor 2 is built in with a case 25 and a frame 29. The cylindrical case 25 has a cylindrical shape with a bottom face 25a having a flange. The frame 29 has a disk shape. The frame 29 serves as a lid for the case 25. The motor 2 includes a rotor 23, a stator 22, a bearing 26a, a bearing 26b, and a wire connection member 27.

The rotary shaft 21 is arranged along a center axis of the case 25. The rotary shaft 21 is rotatably supported by the bearing 26a on the bottom face 25a of the case 25. The rotary shaft 21 protrudes from the case 25 on the bottom face 25a. Owing to this configuration, an output of the motor 2 is extracted to the outside of the case 25 on the bottom face 25a side.

The rotary shaft 21 is rotatably supported by the bearing 26b on the frame 29. The rotary shaft 21 protrudes from the frame 29 on the frame 29 side. Further, a magnet rotor 5b fitted to the rotary shaft 21 on the frame 29 side.

The rotor 23 has a cylindrical shape, and is fixed to a radially outer periphery of the rotary shaft 21. The rotor 23 rotates together with the rotary shaft 21. A plurality of pairs of permanent magnets (not shown) are arranged on an outer peripheral face of the rotor 23.

The stator 22 has a cylindrical shape, and is arranged on the radially outer side of the rotor 23 so as to face the rotor 23. The stator 22 is fixed to an inner wall of the case 25. A multi-phase winding 24 is wound around the stator 22. The wire connection member 27 is provided between the winding 24 and the frame 29, and includes an annular bus bar built therein. The winding 24 is connected by the wire connection member 27. The winding 24 is connected, for example, by a star connection, and the motor 2 has a configuration of a three-phase brushless motor. The winding 24 may be connected by a delta connection. Winding end portions 28 being terminals of the winding 24 are metal terminal rods, and are provided so as to extend from the wire connection member 27 toward the control unit 1. The winding end portions 28 penetrate the frame 29 to enter the control unit 1.

The control unit 1 is built in with the frame 29 and a housing 10. The housing 10 has a cylindrical shape and is closed on one side thereof. The frame 29 serves as a radiator plate for components of the control unit 1.

In the housing 10, a relay member 4 having a disk shape and a circuit board 3 having a disk shape are arranged in this sequence from a side close to the frame 29. Second jumper wires 8b are fixed to the relay member 4, and extend toward a radially outer side of the housing 10. Meanwhile, first jumper wires 8a are fixed to the circuit board 3, and extend toward the radially outer side of the housing 10. The first jumper wires 8a serve as first signal terminals, and the second jumper wires 8b serve as second signal terminals.

A power module 6 including an inverter circuit is mounted on a face of the relay member 4 on the frame 29 side. The power module 6 is in contact with the frame 29. The heat generated by the power module 6 is transferred to the frame 29, and is radiated by the frame 29. The power module 6 includes a plurality of power module terminals 6a. The power module 6 serves as a current supply circuit, and the power module terminals 6a serve as supply terminals.

A plurality of extension members 9 are fixed to the relay member 4. Each of the extension members 9 is made of metal, and has a U-shaped cross-section. Each of the extension members 9 extends from the relay member 4 toward the radially outer side of the housing 10. One end 9a of each of the U-shaped extension members 9 is an end on a side extending toward the radially outer side of the housing 10. The one end 9a of each of the extension members 9 is connected to a corresponding one of the winding end portions 28, thereby forming a first connection portion 101. Further, another end 9c of each of the U-shaped extension members 9 is fixed to the relay member 4, and is connected to a corresponding one of the power module terminals 6a. That is, the power module 6 supplies a current to each of the winding end portions 28 via the corresponding extension member 9. Further, the first connection member 101 connects each of the winding end portions 28 and the corresponding power module terminal 6a to each other. The first connection portion 101 is arranged on the radially outer side of the housing 10 with respect to the power module 6.

A rotation sensor 5a is arranged so as to face the magnet rotor 5b, on the face of the relay member 4 on the frame 29 side. The rotation sensor 5a is configured to measure a rotation angle and a rotation speed of the rotary shaft 21.

The second jumper wires 8b each having an L-shape are fixed to a face of the relay member 4 on the side opposite to the frame 29. One end of each of the second jumper wires 8b is connected to the relay member 4 through soldering. Another end of each of the second jumper wires 8b extends toward the radially outer side of the housing 10. The second jumper wires 8b are connected to an input line of the power module 6 and an output line of the rotation sensor 5a.

A control circuit which is configured to control the motor 2 and which includes at least a CPU 7 is mounted on the circuit board 3. The CPU 7 is arranged on a face of the circuit board 3 on the side opposite to the frame 29.

The first jumper wires 8a each having an L-shape are fixed to a face of the circuit board 3 on the frame 29 side. One end of each of the first jumper wires 8a is connected to the circuit board 3 through soldering. Another end of each of the first jumper wires 8a faces each of the second jumper wires 8b of the relay member 4 and extends toward the radially outer side of the housing 10. The first jumper wires 8a are connected to an output line of the CPU 7. Each of the first jumper wires 8a is connected to the corresponding second jumper wire 8b, at a second connection portion 102. A connector 12 and a connector 13 are arranged outside the housing 10.

Figure 2:
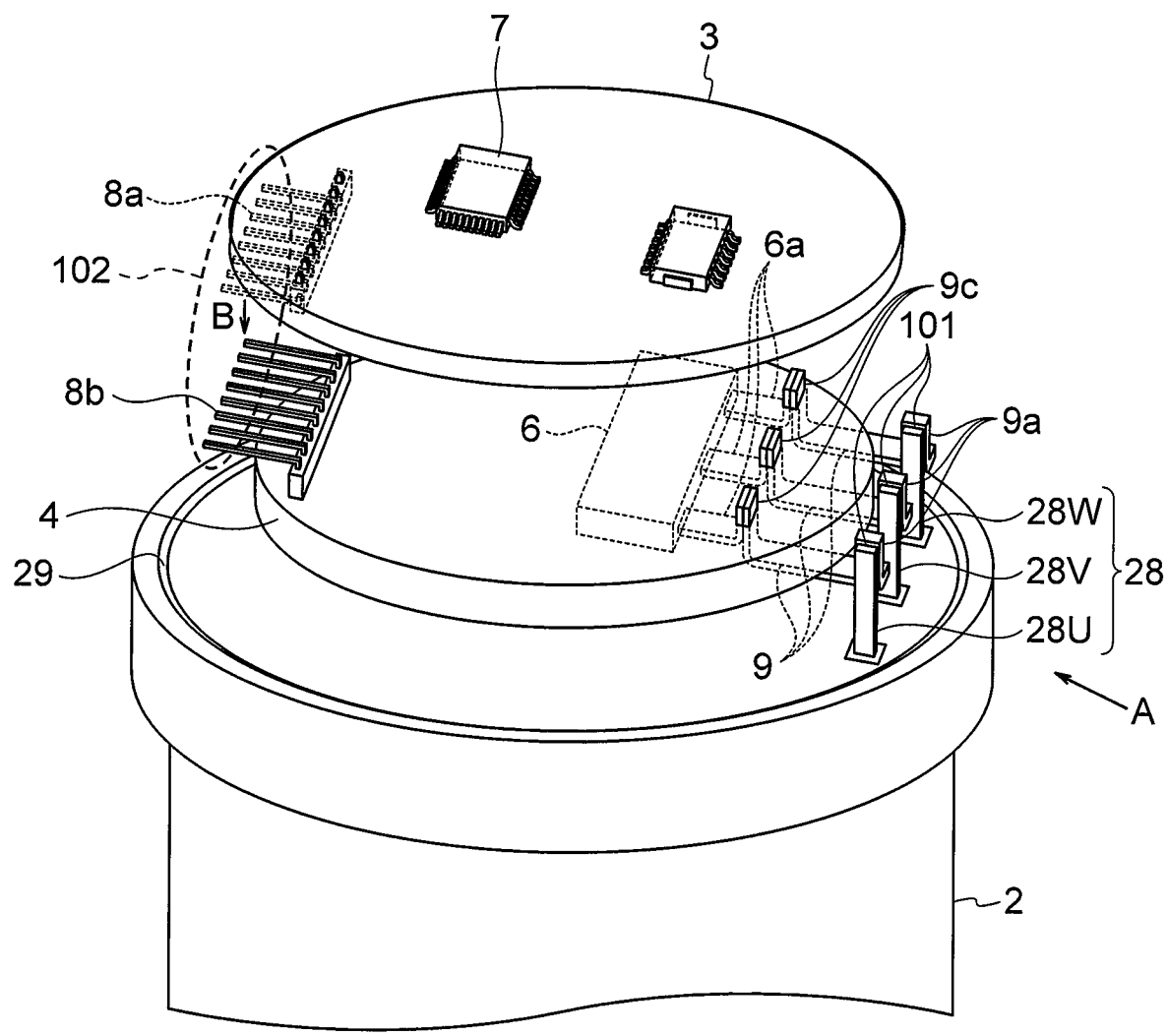
FIG. 2 is an exploded perspective view for schematically illustrating a motor, a circuit board, and intermediate members in the first embodiment.

FIG. 2 is an exploded perspective view for schematically illustrating the motor 2, the relay member 4, and the circuit board 3. The details of the first connection portion 101 and the second connection portion 102 are described with reference to FIG. 2.

First, the first connection portion 101 is described. The first connection portion 101 connects each of the winding end portions 28 of the motor 2 and the corresponding power module terminal 6a to each other. The motor 2 is a three-phase winding motor. Three winding end portions 28U, 28V, and 28W of the motor 2 extend from the motor 2 into the control unit 1.

The motor 2 is a three-phase winding motor. Therefore, the power module 6 includes three power module terminals 6a. Each of the extension members 9 is connected to the corresponding three power module terminal 6a. Each of the extension members 9 is a member obtained by bending a flat plate having an inversed L-shape at a right angle at two positions. One end 9a of each of the extension members 9 is bent along a corresponding one of the winding end portions 28. Another end 9c of each of the extension members 9 is bent along a corresponding one of the power module terminals 6a. The one end 9a of each of the extension members 9 is connected to a corresponding one of the winding end portion 28U, the winding end portion 28V, and the winding end portion 28W, at the first connection portion 101. The another end 9c of each of the extension members 9 is connected to a corresponding one of the power module terminals 6a, at the relay member 4.

Next, the second connection portion 102 is described. Eight first jumper wires 8a extend from the circuit board 3 toward the radially outer side of the housing 10. Meanwhile, eight second jumper wires 8b extend from the relay member 4 toward the radially outer side of the housing 10. When the circuit board 3 is brought toward the relay member 4 as indicated by an arrow B, each of the first jumper wires 8a comes into contact with the corresponding one of the second jumper wires 8b. The second connection portion 102 is formed by connecting each of the first jumper wires 8a and the corresponding second jumper wire 8b to each other. The second connection portion 102 is arranged at a position apart from the first connection portion 101, in a circumferential direction of the housing 10.

Figure 3:
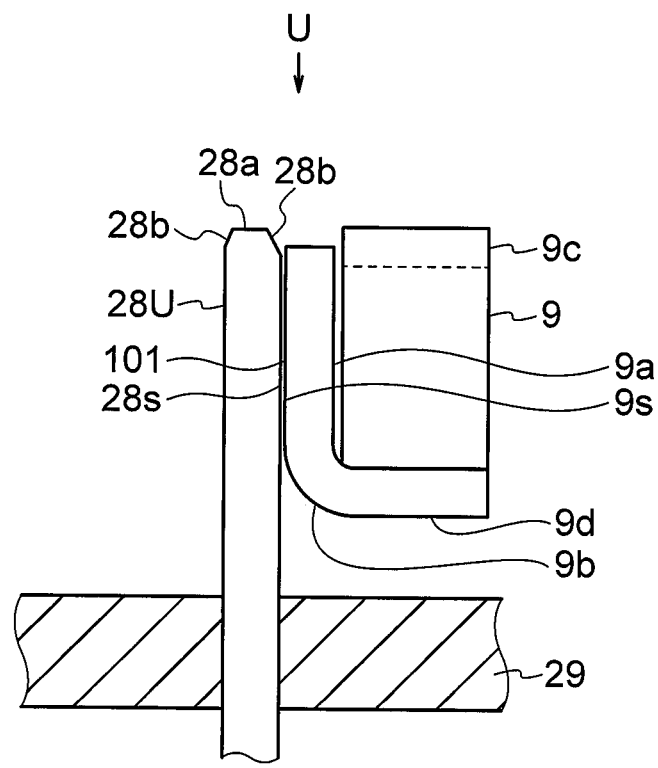
FIG. 3 is an enlarged view for illustrating a periphery of a first connection portion in the first embodiment, and is a view for illustrating a periphery of one winding end portion as viewed from the direction indicated by the arrow A of FIG. 2.

FIG. 3 is an enlarged view for illustrating a periphery of the first connection portion 101. FIG. 3 is a view for illustrating a periphery of the winding end portion 28U as viewed from the direction indicated by the arrow A of FIG. 2, that is, from the radially outer side of the housing 10. The one end 9a of each of the extension members 9 is bent from a bottom portion 9d toward the side opposite to the frame 29, and extends along the winding end portion 28U. A side face 9s of the one end 9a is in contact with a side face 28s of the winding end portion 28U. Through welding of the side face 28s and the side face 9s to each other, the winding end portion 28U is connected to the extension member 9, thereby forming the first connection portion 101. A rounded portion 9b is formed along the bottom portion 9d of the one end 9a. A top portion 28a of the winding end portion 28U is chamfered, and inclined portions 28b are formed. The rounded portion 9b serves as a first inclined portion.

Figure 4:
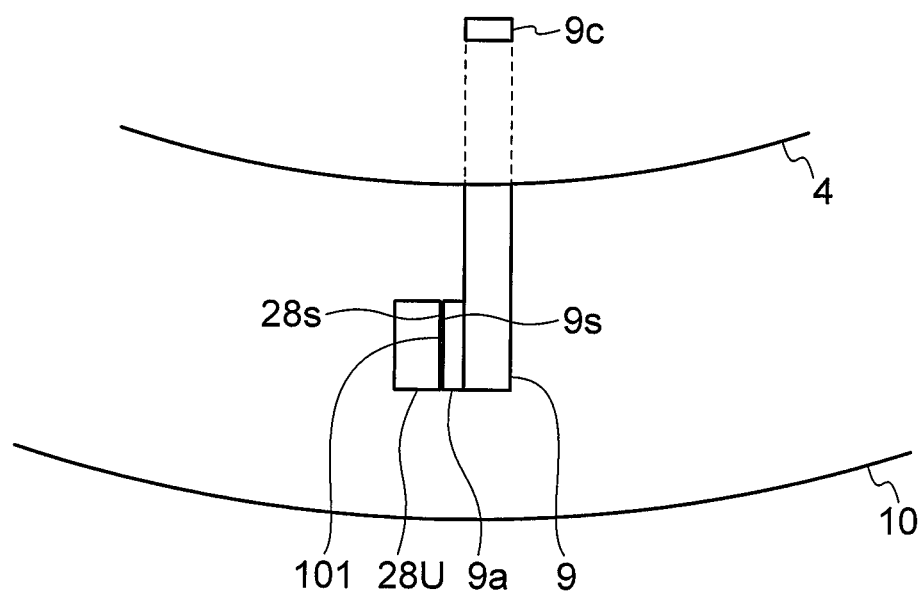
FIG. 4 is a view from the direction indicated by the arrow U of FIG. 3.

FIG. 4 is a view for illustrating a periphery of the winding end portion 28U as viewed from the direction indicated by the arrow U of FIG. 3. The extension member 9 extends from the another end 9c toward the radially outer side of the housing 10. The side face 28s of the winding end portion 28U is connected to the side face 9s of the one end 9a of the extension member 9, at the first connection portion 101.

Next, the operation of the first connection portion 101 and the second connection portion 102 is described with reference to FIG. 1 and FIG. 3. As illustrated in FIG. 1, the first connection portion 101 is arranged on the radially outer side of the housing 10 with respect to the power module 6. Therefore, it is easy, for example, to weld and fix the winding end portion 28U and the one end 9a of the extension member 9 to each other, from the radially outer side of the housing 10. Therefore, the operability regarding the first connection portion 101 can be improved. Further, it is possible to visually check whether the side face 28s of the winding end portion 28U and the side face 9s of the one end 9a of the extension member 9 are definitely connected to each other, from the radially outer side of the housing 10.

As illustrated in FIG. 1, the first connection portion 101 is located between the circuit board 3 and the motor 2. That is, each of the winding end portions 28 is connected to the corresponding extension member 9 at positions spaced as far apart as possible from the circuit board 3 in the control unit 1. For example, in pulse width modulation (PWM) control for turning a motor current on/off at high speed, noise is generated due to the frequent switching of the motor current. Through the spacing of the first connection portion 101 as far apart as possible from the circuit board 3 including many signal lines, the circuit board 3 becomes less liable to be influenced by the noise generated through switching.

As illustrated in FIG. 1, both the first jumper wires 8a and the second jumper wires 8b extend toward the radially outer side of the housing 10, at the second connection portion 102. Therefore, it is easy to connect each of the first jumper wires 8a and the corresponding second jumper wire 8b to each other from the radially outer side of the housing 10, and form the second connection portion 102. Accordingly, the operability regarding the second connection portion 102 can be improved. Further, it is possible to visually check whether each of the first jumper wires 8a and the corresponding second jumper wires 8 are definitely connected to each other, from the radially outer side of the housing 10.

In FIG. 3, in the structure illustrated in the first embodiment, as for the extension member 9 and the winding end portion 28U, the bottom portion 9d of the extension member 9 and the top portion 28a of the winding end portion 28U approach each other to come into contact with each other. In this case, the bottom portion 9d of the one end 9a of the extension member 9 may collide with the top portion 28a of the winding end portion 28U. Thus, the bottom portion 9d of the one end 9a in the first embodiment has the rounded portion 9b. This makes it possible to prevent the bottom portion 9d of the one end 9a and the top portion 28a of the winding end portion 28U from colliding with each other. The inclined portions 28b formed at the top portion 28a of the winding end portion 28U also enables prevention of such a collision.

As described above, the electric power steering device according to the first embodiment includes the motor 2 and the control unit 1 configured to control the motor 2, which are integrated with each other in alignment with each other in the axial direction of the rotary shaft 21 of the motor 2, and the winding 24 of the motor 2 includes the winding end portions 28 configured to receive a current supplied thereto. The control unit 1 includes: the power module 6, which includes the power module terminals 6a, and is configured to supply the current to the winding end portions 28; the extension members 9 connected to the corresponding power module terminal 6a; and the first connection portion 101 at which each of the extension members 9 and the corresponding winding end portion 28 are connected to each other. The first connection portion 101 is arranged on the radially outer side of the motor 2 with respect to the power module 6.

In the first embodiment, the first connection portion 101 is located close to the radially outer side in the housing 10, and the operation regarding the first connection portion 101 can be performed from the radially outer side of the housing 10. Therefore, the operation man-hours and manufacturing costs regarding the first connection portion 101 can be reduced.

Thus, the electric power steering device which enables improvement in operability in manufacturing the device and reduction in cost for manufacturing can be provided.

The first connection portion 101 is arranged between the circuit board 3 and the motor 2. On the circuit board 3, the CPU 7 configured to control the motor 2 is mounted. That is, the first connection portion 101 which allows a motor current to flow therethrough is spaced apart from the circuit board 3 including many signal lines. The circuit board 3 becomes less liable to be influenced by the noise generated through switching. Thus, the electric power steering device that is advantageous in terms of noise can be provided.

The one end 9a of each of the extension members 9 has the rounded portion 9b. With this structure, the bottom portion 9d of the one end 9a of the extension member 9 and the top portion 28a of the winding end portion 28U can be prevented from colliding with each other as happens when the extension member 9 and the winding end portion 28U are brought into contact with each other. Thus, the operation man-hours and manufacturing costs regarding the operation regarding the first connection portion 101 can be reduced.

The control unit 1 includes: the circuit board 3, which includes the first jumper wires 8a, and on which the CPU 7 configured to control the motor 2 is mounted; the relay member 4, which includes the second jumper wires 8b, and on which the power module 6 is mounted; and the second connection portion 102 which connects each of the first jumper wires 8a and the corresponding second jumper wire 8b to each other. The second connection portion 102 extends toward the radially outer side of the motor 2. Therefore, the operation regarding the second connection portion 102 can be performed from the radially outer side of the motor 2, that is, the radially outer side of the housing 10. Thus, the operation man-hours and manufacturing costs regarding the operation regarding the second connection portion 102 can be reduced.

The second connection portion 102 is arranged at a position apart from the first connection portion 101 in the circumferential direction of the motor 2. With this structure, the operation regarding the first connection portion 101 and the operation regarding the second connection portion 102 do not interfere with each other. Thus, the operation man-hours and manufacturing costs regarding the operations regarding the first connection portion 101 and the second connection portion 102 can be reduced.

Each of the winding end portions 28 and the corresponding extension member 9 are connected to each other, without the intermediation of the circuit board 3. Thus, the circuit board 3 can be reduced in size. Accordingly, the electric power steering device can be reduced in size.

As for the second connection portion 102, connection between the circuit board 3 and the relay member 4 has been described. However, the same as in the case described as to the second connection portion 102 holds true for the case in which the circuit board 3 and a terminal of the connector 12 or the connector 13 are connected to each other. That is, through the arrangement of the respective signal lines in such a manner as to extend toward the radially outer side of the housing 10, the operation of connecting them can easily be performed.

Figure 5:
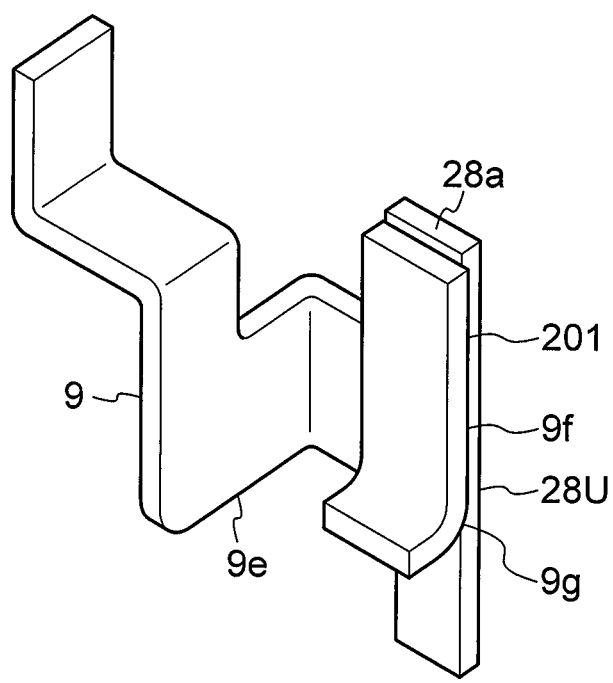
FIG. 5 is a perspective view for illustrating a modification example of an extension member in the first embodiment.

FIG. 5 is a perspective view for illustrating a modification example of each of the extension members 9. In the first embodiment, the winding end portions 28 are located such that the extension members 9 extend toward the radially outer side of the housing 10. However, depending on the arrangement of various components in the motor 2 and the control unit 1, the winding end portion 28U may be located such that the extension member 9 does not extend toward the radially outer side of the housing 10, as in this modification example. In this case, as illustrated in FIG. 5, through deformation of the extension member 9, it is possible to cause the extension member 9 to extend toward the radially outer side of the housing 10 while approaching the winding end portion 28U. This can be achieved by adding an operation of drawing around the extension member 9 in the circumferential direction of the housing 10. Further, the extension member 9 is formed with one end 9f thereof welded to a main body 9e thereof. The winding end portion 28U is connected to the one end 9f of the extension member 9, at a first connection portion 201. In this case, the first connection portion 201 and the second connection portion 102 are spaced apart from each other in the circumferential direction of the housing 10.

A rounded portion 9g which is curved in a direction away from the winding end portion 28U is formed at a lower portion of the one end 9f. The rounded portion 9g serves as the first inclined portion. As described above, even in the case in which the one end 9f is formed through welding, the presence of the rounded portion 9g prevents the one end 9f and the top portion 28a of the winding end portion 28U from colliding with each other, and the operability at the first connection portion 201 is improved. Although the rounded portion 9b can be simultaneously formed in bending the one end 9a in the first embodiment, the rounded portion 9g needs to be formed through another bending operation in this modification example.

As described above, the control unit 1 includes the extension members 9 which are respectively connected to the corresponding power module terminals 6a. The corresponding one of the power module terminals 6a is connected to the winding end portion 28U via the corresponding one of the extension members 9, at the first connection portion 201. Depending on the arrangement of the various components in the motor 2 and the control unit 1, the winding end portions 28 may be located such that the extension members 9 do not extend toward the radially outer side of the housing 10. In this case, through deformation of each of the extension members 9, it is possible to cause the extension member 9 to extend toward the radially outer side of the housing 10 while approaching the winding end portion 28U. Therefore, the first connection portion 201 can be arranged on the radially outer side of the motor 2 with respect to the power module 6. Thus, the operation man-hours and manufacturing costs regarding the first connection portion 201 can be reduced.

The rounded portion 9g is formed at the one end 9f of the extension member 9. With this structure, the one end 9f of the extension member 9 and the top portion 28a of the winding end portion 28U can be prevented from colliding with each other as happens when the extension member 9 and the winding end portion 28U are brought into contact with each other. Thus, the operation man-hours and manufacturing costs regarding the operation regarding the first connection portion 201 can be reduced.

Second Embodiment

Next, an electric power steering device according to a second embodiment is described with reference to FIG. 6 and FIG. 7. In the second embodiment, a socket is used for a second connection portion.

Figure 6:
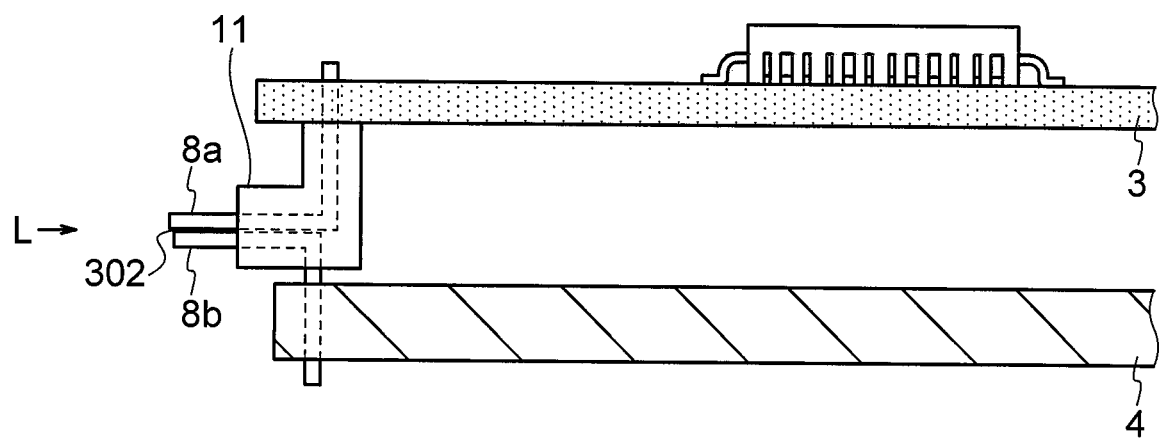
FIG. 6 is a front view for illustrating part of a circuit board and part of a relay member in a second embodiment.

FIG. 6 is a front view for illustrating part of the circuit board 3 and part of the relay member 4 in the second embodiment. The eight L-shaped first jumper wires 8a are fixed to the circuit board 3. One end of each of the first jumper wires 8a is connected to the circuit board 3 through soldering. A vicinity of a flexed region of each of the first jumper wires 8a is covered with a flexed socket 11 made of a resin. Another end of each of the first jumper wires 8a extends toward the radially outer side of the housing 10, from the region covered with the socket 11. The socket 11 serves as a cover member.

The eight L-shaped second jumper wires 8b are fixed to the relay member 4. One end of each of the second jumper wires 8b is connected to the relay member 4 through soldering. Another end of each of the second jumper wires 8b extends toward the radially outer side of the housing 10. Each of the first jumper wires 8a and the corresponding second jumper wire 8b are connected to each other, at a second connection portion 302.

Figure 7:
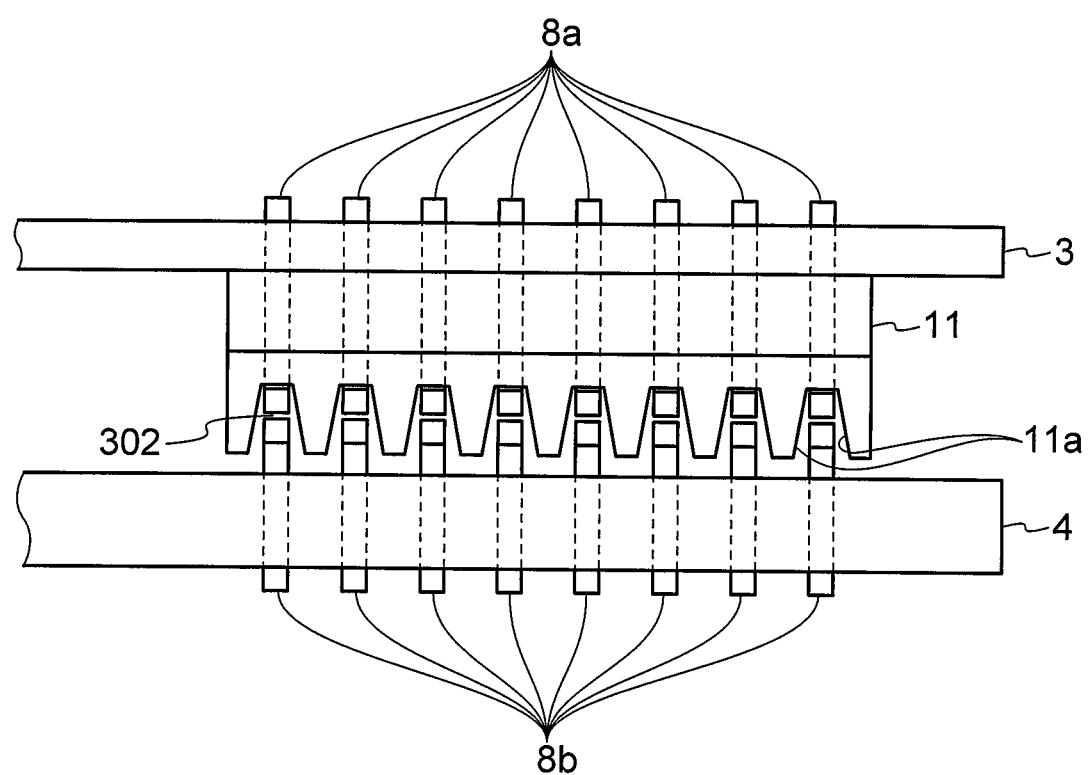
FIG. 7 is aside view for illustrating a periphery of a second connection portion as viewed from the direction indicated by the arrow L of FIG. 6.

FIG. 7 is a side view for illustrating a periphery of the second connection portion 302 as viewed from the direction indicated by the arrow L of FIG. 6. The socket 11 is provided, on both right and left sides of each of the first jumper wires 8a, with inclined faces 11a in a region in which each of the first jumper wires 8a is covered. Each of the first jumper wires 8a is arranged in a bottom region of a valley defined between the right and left inclined faces 11a. Each of the inclined faces 11a serves as a second inclined portion.

As the circuit board 3 and the relay member 4 approach each other, each of the second jumper wires 8b moves toward a bottom of the socket 11, along the inclined faces 11a of the socket 11, and then comes into contact with the corresponding one of the first jumper wires 8a. In FIG. 7, each of the first jumper wires 8a and the corresponding second jumper wire 8b are almost in contact with each other, and hence it is easy to connect, for example, weld each of the first jumper wires 8a and the corresponding second jumper wire 8b to each other.

Thus, with the presence of the socket 11 having the inclined faces 11a on the first jumper wire 8a sides, the socket 11 guides the approaching second jumper wires 8b. Therefore, the second jumper wires 8b can be easily positioned with the corresponding first jumper wire 8a which is retained on bottoms of the inclined faces 11a. Thus, the operability of connection regarding the second connection portion 302 is improved.

As described above, the socket 11 which is configured to partially cover the first jumper wires 8a is provided to the first jumper wires 8a, and the socket 11 has the inclined faces 11a. With this structure, each of the second jumper wires 8b can be connected to the corresponding first jumper wire 8a, while being guided by the socket 11. Therefore, each of the second jumper wires 8b is easily positioned with the corresponding first jumper wire 8a, and the operability of connection regarding the second connection portion 302 is improved. Thus, the operation man-hours and manufacturing costs regarding the operation regarding the second connection portion 302 can be reduced.

The first jumper wires 8a and the second jumper wires 8b are lines for transmitting signals, and hence are smaller in wire diameter than the winding 24 which allows the current of the motor 2 to flow therethrough. Therefore, it may be difficult to maintain the linearity of the first jumper wires 8a and the second jumper wires 8b. Further, in general, a plurality of jumper wires are arranged in parallel, and hence a socket is often used for the jumper wires. In the second embodiment, the socket 11 is provided only to the first jumper wires 8a. However, sockets 11 may be provided to both the first jumper wires 8a and the second jumper wires 8b.

REFERENCE SIGNS LIST 1 control unit, 2 motor, 3 circuit board, 4 relay member, 6 power module (current supply circuit), 6a power module terminal (supply terminal), 7 CPU (control circuit), 8a first jumper wire (first signal terminal), 8b second jumper wire (second signal terminal), 9 extension member, 9b, 9g rounded portion (first inclined portion), 11 socket (cover member), 11a inclined face (second inclined portion), 21 rotary shaft, 24 winding, 28, 28U, 28V, 28W winding end portions, 101, 201 first connection portion, 102, 302 second connection portion.

The invention claimed is:
1. An electric power steering device, comprising:
a motor having a winding; and
a controller configured to control the motor,
the motor and the controller being integrated with each other in alignment with each other in an axial direction of a rotary shaft of the motor,
wherein the winding of the motor includes a winding end portion configured to receive a current supplied thereto,
wherein the controller includes:
a current supply circuit, which includes a supply terminal, and is configured to supply the current to the winding end portion;
an extension member connected to the supply terminal; and
a first connection portion at which the extension member and the winding end portion are connected to each other,
wherein the first connection portion is arranged on a radially outer side of the motor with respect to the current supply circuit,
wherein the extension member extending in a radial direction of the rotary shaft is bent in an axial direction of the rotary shaft opposite to the motor to be connected to the winding end portion, a portion of the extension member which is bent forming an inclined portion, and
wherein the winding end portion has a first inclined portion at a top end of the winding end portion opposite to the motor.
2. The electric power steering device according to claim 1, wherein the first connection portion is arranged between a circuit board, on which a control circuit configured to control the motor is mounted, and the motor.
3. The electric power steering device according to claim 1,
wherein the controller further includes:
a circuit board, which includes a first signal terminal, and on which a control circuit configured to control the motor is mounted;
a relay member, which includes a second signal terminal, and on which the current supply circuit is mounted; and
a second connection portion which connects the first signal terminal and the second signal terminal to each other, and
wherein the second connection portion extends toward the radially outer side of the motor.
4. The electric power steering device according to claim 3, wherein the second connection portion is arranged at a position apart from the first connection portion in a circumferential direction of the motor.
5. The electric power steering device according to claim 4, further comprising a cover member, which is provided to the first signal terminal or the second signal terminal, and is configured to at least partially cover the first signal terminal and the second signal terminal,
wherein the cover member has a second inclined portion.
6. The electric power steering device according to claim 3, further comprising a cover member, which is provided to the first signal terminal or the second signal terminal, and is configured to at least partially cover the first signal terminal and the second signal terminal,
wherein the cover member has a second inclined portion.

* * * * *